Jan. 22, 1952
P. C. DURLAND
2,583,363
CAM CUTTING MACHINE
Filed April 27, 1949
4 Sheets-Sheet 1
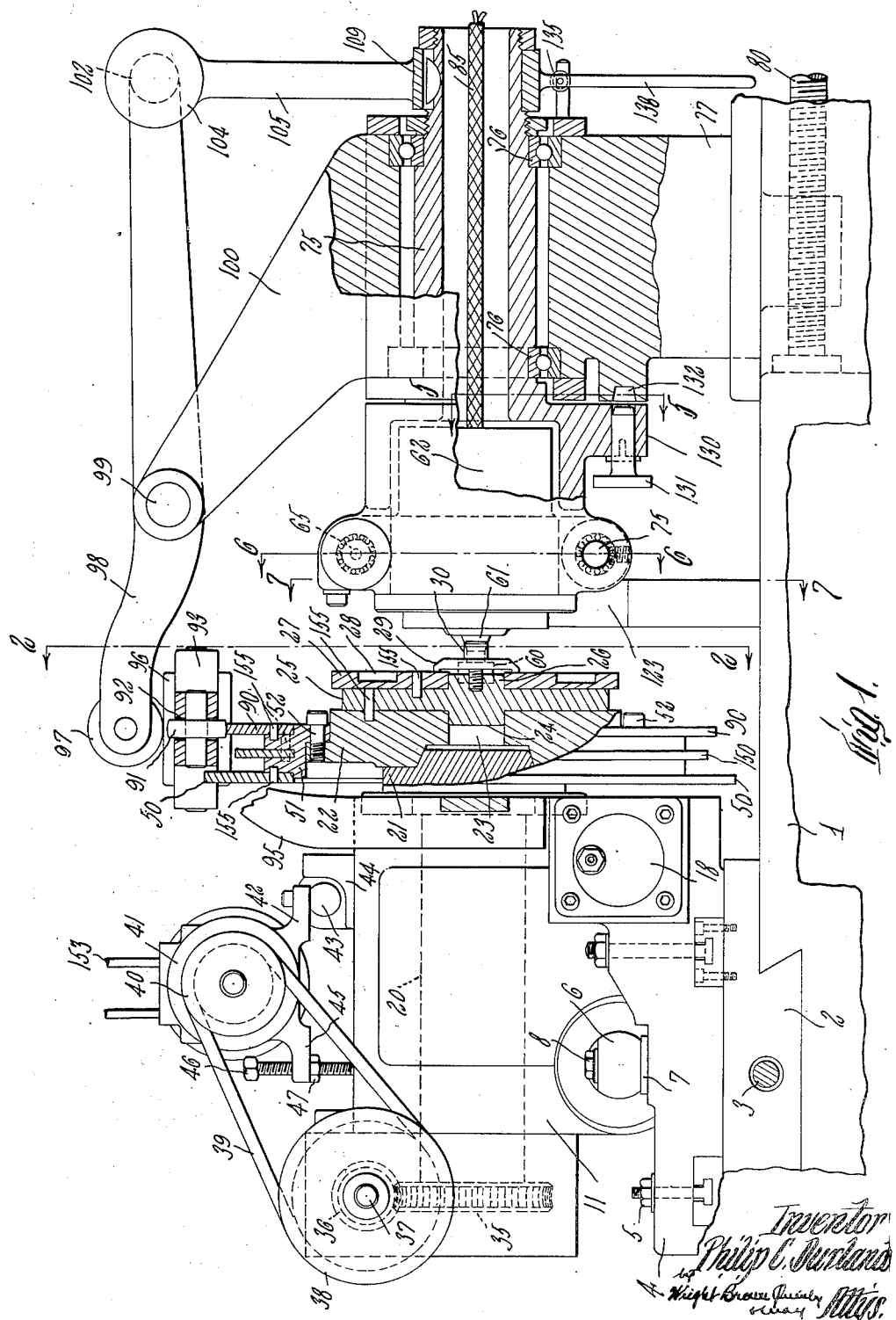

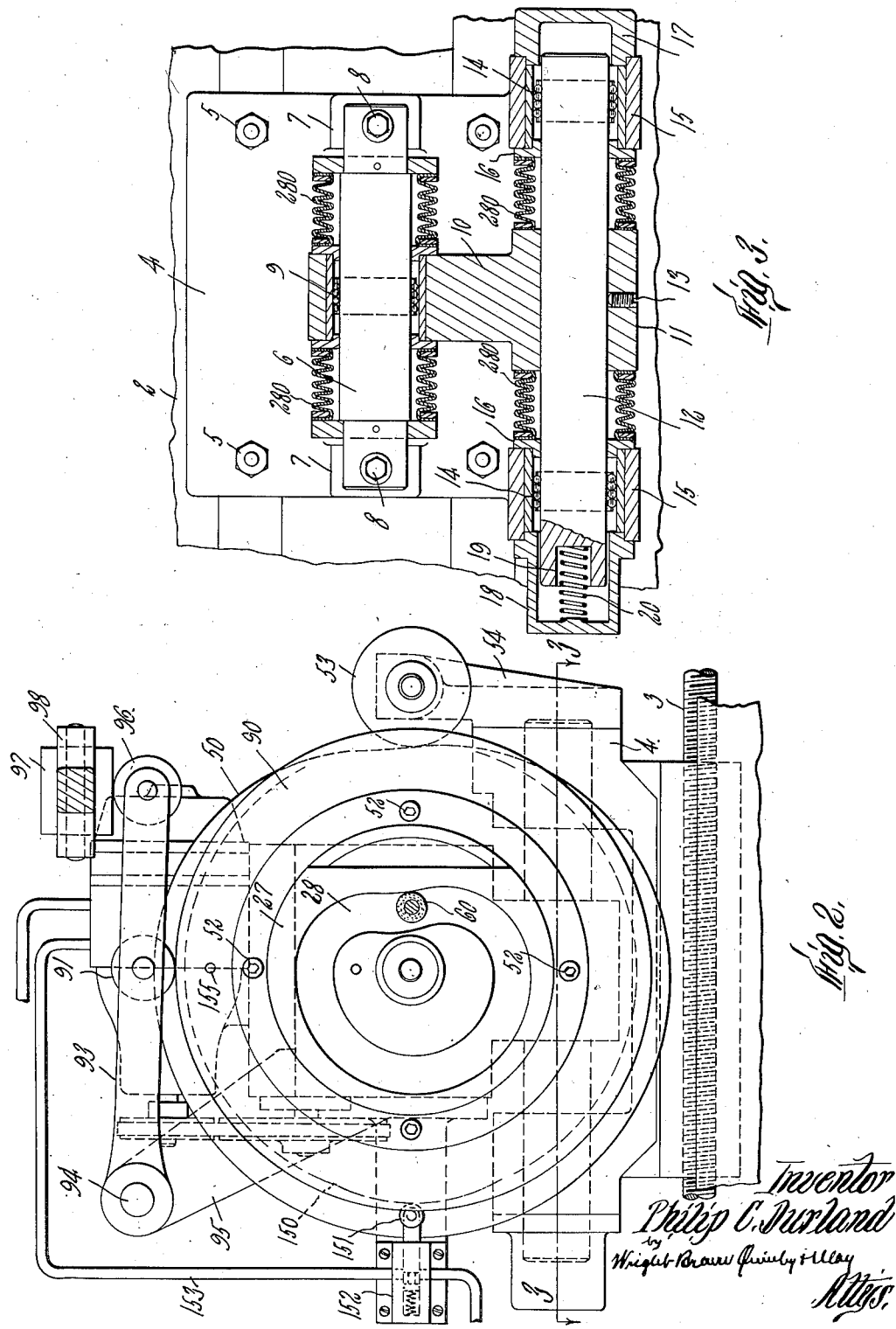

Jan. 22, 1952 P. C. DURLAND 2,583,363
CAM CUTTING MACHINE
Filed April 27, 1949 4 Sheets-Sheet 3
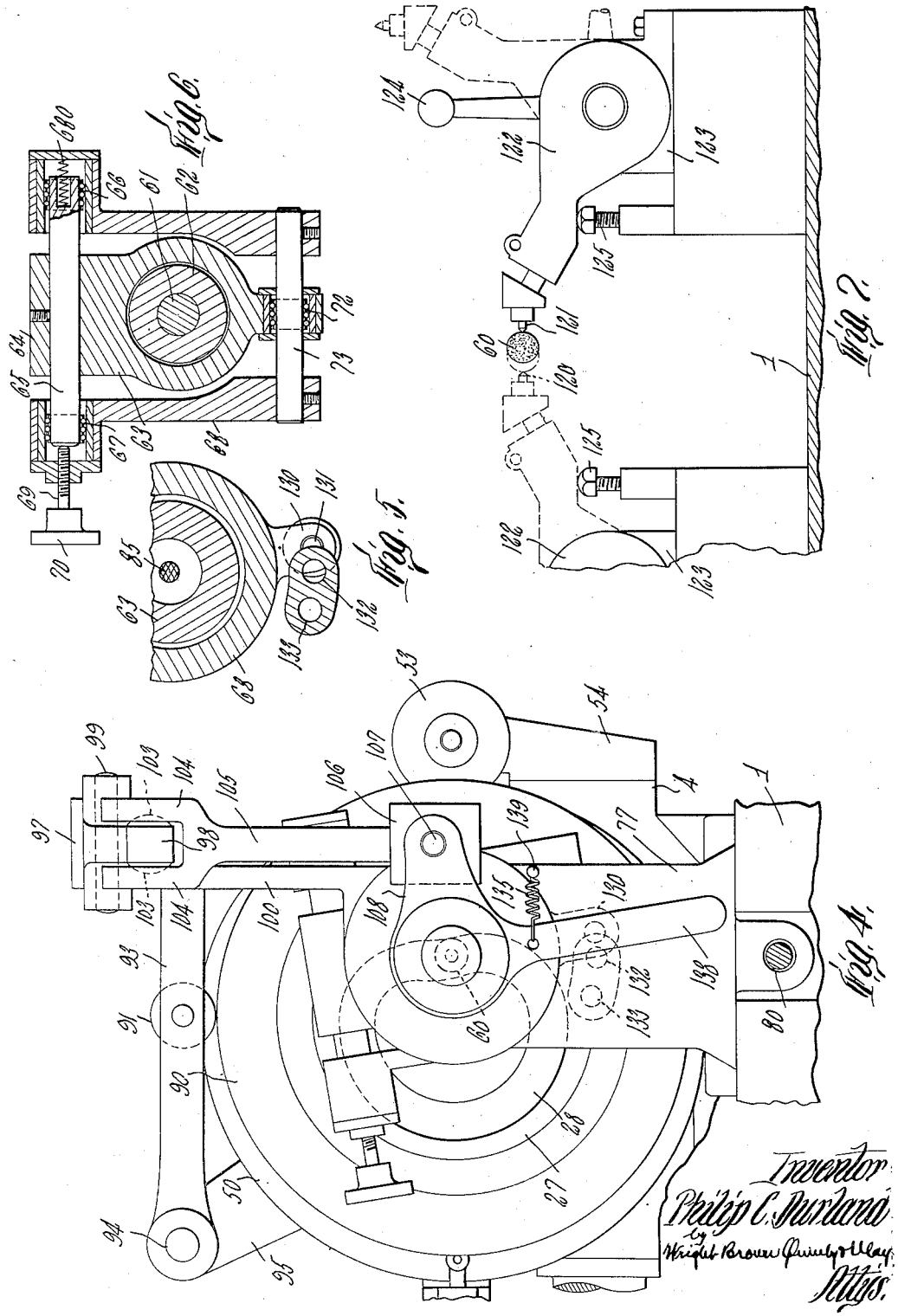

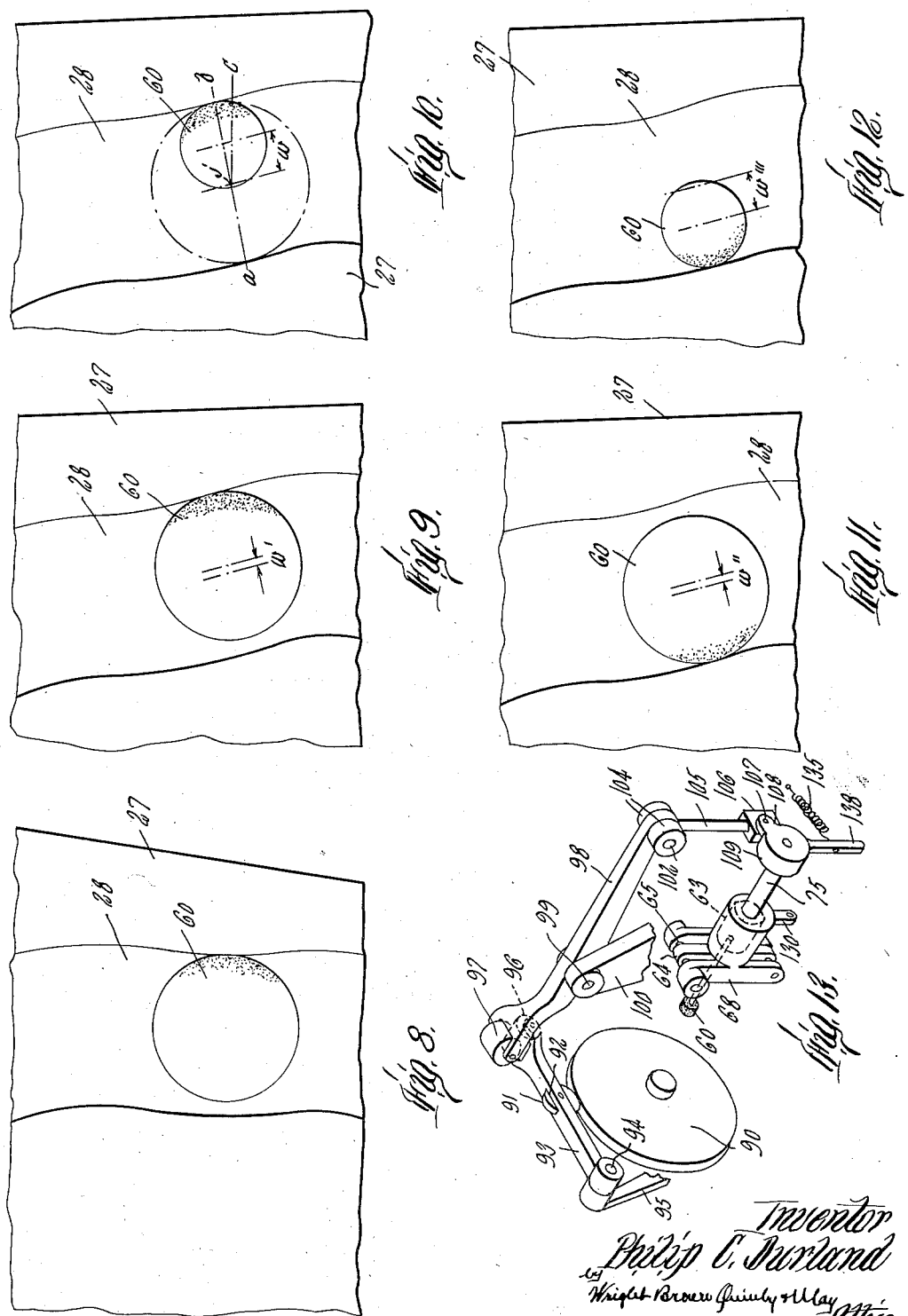

Patented Jan. 22, 1952

2,583,363

UNITED STATES PATENT OFFICE 2,583,363

CAM CUTTING MACHINE

Philip C. Durland, Springfield, Vt., assignor to Bryant Chucking Grinder Company, Springfield, Vt., a corporation of Vermont Application April 27, 1949, Serial No. 90,004

3 Claims. (Cl. 51—101)

This invention relates to cutting of cams and has for an object to provide a method and machine wherein variations of diameter of a rotary cutting tool such as a grinding wheel as it becomes worn and is trued will not affect the accuracy of the cam surface. To this end the method and machine provide for contacting the wheel with the work at the same point on the work regardless of the diameter of the cutter. Since in most cams the desired cam contour changes in direction with respect to a radius of the cam from point to point angularly, corresponding changes in contact between the grinding wheel and the work are necessary with changes in cutter diameter to maintain the desired relation.

In accordance with this invention, therefore, either the work or wheel carriage is given a motion radial to the cam axis in accordance with variations of distance between the axis of rotation of the cam and the center of its cam path, and the tool motion may be modified by an angular component depending upon the variations of the cam path from perpendicular to the radial at any point. The extent of this modified tool positioning in the angular direction is dependent upon the diameter of the tool with reference to the diameter of the cam follower or the width of the cam groove or the desired distance of the center of oscillation of a follower for the cam, which may or may not be as great as the width of the cam groove.

For a complete understanding of this invention, reference may be had to the accompanying drawings in which Figure 1 is a fragmentary view partly in front elevation and partly broken away and in section of a cam grinding machine embodying the invention.

Figure 2 is a sectional view on line 2—2 of Figure 1.

Figure 3 is a detail sectional view on line 3—3 of Figure 2.

Figure 4 is a right hand end elevation of the parts shown in Figure 1.

Figures 5, 6 and 7 are detail sectional views on the correspondingly numbered section lines of Figure 1.

Figures 8 to 12 are diagrammatic views illustrating relative positions between the wheel and the work for wheels of different sizes and for opposite sides of a cam groove.

Figure 13 is a fragmentary perspective view showing the mechanism for correcting error otherwise present due to changes of tool diameter.

In accordance with the embodiment of the invention shown herein, the cam blank is mounted in such a manner that it is given a motion in a direction radial to the axis of rotation of the cam made from the blank while it is being rotated about that axis and the corrective component of motion is applied to the grinding wheel so that at any particular portion of the cam path the wheel contacts the work where it would if it were of a predetermined diameter which is usually equal to the width of the cam path. It should be evident, however, that other divisions of the radial moving and corrective components might be employed without departing from the invention.

Referring particularly to Figures 1, 2 and 3, the machine comprises a bed 1 supporting for front and back adjustment thereon, a carriage 2. This carriage 2 may be adjusted in a sliding direction by turning a feed screw 3 which is threaded through the slide carriage 2 and is held against axial motion by any suitable means not shown herein.

On the slide 2 there is clamped a second bed 4 which may be secured in position thereon by tightening the clamp nuts 5. This second bed 4 has secured thereto and extending in the sliding direction of the carriage 2, a bar 6 (see Figure 3), this bar being fixed at its ends to spaced posts 7 as by clamping bolts 8. This bar 6 slidably supports, as on ball bearings 9, a portion 10 of a work support 11. This portion 10 has fixed thereto a bar 12 as by a set screw 13, this bar being supported near its ends in ball bearings 14 slidably carried in sleeves 15 closed at their ends and to the bar 12 by caps 17 and 18 and washers 16, respectively. The bearings 14 and 15 are carried by the upper bed 4. The bearing surfaces of the bars 6 and 12 are protected from dirt by the flexible enclosing sleeves 280. The bar 12 is pressed axially, and as shown in Figure 3 to the right, by a spring 20 housed within the cap 18 and engaging in a socket 19 in the adjacent end of the bar 12.

The work holder 11 has journaled therein transverse to its sliding direction a spindle 20 having a nose member 21 at one end for supporting a cam-carrying ring 22. This ring 22 has a centering opening 23 for the reception of a boss 24 of a face plate 25. This face plate 25 has an outwardly extending centering boss 26 to receive the cam blank 27 in the outer face of which a cam groove 28 is to be cut. The cam blank 27 may be held in position by a clamping spider 29 engaging its outer face and held to the face plate 25 as by a screw 30.

The spindle 20 is provided with suitable means by which it may be turned so that the cam groove 28 may be cut throughout its complete circumference. As shown this turning means comprises a worm wheel 35 carried by the rear end of the spindle 20 with which meshes a worm 36 carried by a shaft 37 which also carries a belt pulley 38 about which extends a driving belt 39 from the driving pulley 40 of a motor 41. This motor (shown as an hydraulic motor) is suitably mounted on the top face of the work carriage 20. As shown, a foot 42 of the motor base is secured to a rocking bar 43 journaled in bearings 44 at the top of the carriage 11 and a second foot 45 is adjustable vertically by turning a screw 46 having threaded connection with the foot 45 and projecting from the work carriage 11 and provided with a check nut 47 by which the motor may be locked in adjusted position. This means provides for adjustment of the belt tension.

As before noted, the extension 10 of the work carriage 11 is pressed in one direction by the spring 20. This motion is limited by an edge cam ring 50 carried by a ring 51 secured to the periphery of the cam-carrying ring 22 as by screws 52, this cam 50 engaging a roller 53 journaled on a bracket 54 projecting upwardly from the upper bed 4. The cam 50 is so contoured with respect to the desired contour of the cam groove 28 in a work piece that as the spindle is turned the work carriage is moved, conforming to the contour of a line spaced by a predetermined distance from the desired cam contour, as, for example, the center line of the desired cam groove 28 or the desired path of the center line of the cam follower roll.

If a cam groove cutter of the full width of the cam groove 28 were being employed to cut the cam groove 28, the in and out motion imparted by the cam 50 as the spring 20 is compelled to move the work carrier in accordance with the contour of the edge cam 50, would be sufficient to properly guide the tool to cut the desired cam groove when the center line of the cam groove is to control the motion of the follower. This will be evident from an inspection of Figure 10, wherein the dotted line circle shows the outline of a full width cutter for cutting the cam groove 28. The in and out motion of the work carriage would then control the in and out motion of the axial center of the cutter and the cutter would engage both faces of the cut cam groove at once, tangent or perpendicular at the point of engagement of the cam cutter with the sides of the groove regardless of the particular angle to the radial of the cam surface at the cutting points at opposite edges of the cam groove. Thus as shown in Figure 10, where the sides of the cam groove 28 at the point of cutting are inclined to the left from the vertical, the cutting points will be at the extremities of the diameter $a$—$b$ which is perpendicular to the sides of the cam groove 28 at the points where cutting is taking place, while at the same time the controlled motion of the work holder, which as shown is horizontal, is along a radius $j$—$c$, passing through the center of rotation of the work which is the axis of the spindle 20.

However, if a cutter of a smaller diameter than the width of the groove is to be employed, first working along one edge of the cam groove and then along the other edge, this horizontal feed motion is not satisfactory, as at any position where the edge of the cam groove is not perpendicular to the radius of the cam disk, the cutting would not take place at the proper point. For example, referring to Figure 10, it will be noted that the full size cutter is cutting at the point $b$ in the right hand edge of the cam groove 28 which is above the horizontal position of the axis of the cutting tool at $j$. If, therefore, a cutter of smaller diameter is moved into contact with the right side of the work groove along the horizontal axis, which is the direction of feed imparted by the spring 20, the cutting tool would engage the right hand edge of the groove 28 at a point below the point $b$ toward the point $c$ in horizontal alinement with the central point $j$ which would not produce the desired contour for this edge of the cam. In order to make the small diameter cutter engage at the proper point $b$, it is therefore necessary to impart a tool motion which includes a component perpendicular to the horizontal feed and a component in line therewith resulting in angular displacement of the point of contact between the cutter and the work. The angle of this displacement depends upon the instantaneous slope of the cam path relative to the radial at the point of contact, and the amount of displacement of the wheel axis in this angular direction depends upon the relative diameter of the wheel with relation to the wheel diameter equal to the width of the groove, the greater this difference the greater being the displacement. As shown in Figure 10, for example, the amount of feed to bring the cutter into contact with the point $b$ is represented by the distance $w$ and this is perpendicular to the instantaneous slope of the cam path cutter at $j$ and not horizontal as is the motion produced by the spring 20 as controlled by its cam and follower. Where a larger wheel is employed this distance would be substantially smaller as shown, for example, at $w'$ in Figure 9, but it would still be in the same inclined direction.

Similarly with the same slope of the cam groove 28 and with the wheel working upon the left hand edge of the groove 28 as shown in Figures 11 and 12, the grinding or cutting wheels of the size shown in Figures 11 and 12 would have to be moved with a component below the horizontal at distances shown at $w''$ and $w'''$, respectively, for the different diameters of cutters.

In accordance with this invention, therefore, means are provided for producing this component of motion, the extent of which varies with the diameter of the cutter, being larger as the diameter decreases.

The cutting element, which is shown herein as a grinding wheel 60, is carried by a rotary shaft 61, which, as shown, is an extension of or is coupled coaxial with the armature of a motor 62. This motor 62 is carried by a casing member 63, which, as shown best in Figure 6, has an upward extension 64 through which extends laterally a fixed shaft 65. This shaft is mounted for axial motion in a pair of spaced ball bearings 66 and 67 in a supporting member 68. This shaft 65 is pressed in one direction, as shown to the left in Figure 6, as by a spring 680 against an adjusting screw 69 provided with a hand wheel 70 by which it may be turned. The lower end of the casing 63 is slidable through a bearing 72 along a supporting bar 73 fixed at its ends in the extension 64. The extension 64 has a drum-shaped portion 75 which is journaled in ball bearings 76 for rocking motion in a tool-supporting carriage 77. This carriage 77 is carried by the base 1 and is movable lengthwise of the tool spindle to bring the tool into and out of operative relation to the work piece as by means of a feed screw 80. The drum portion 75 is hollow and provides a passage for the cable 85 which conducts power to the motor 62.

The component of motion of the tool feed transverse to the radial feed imparted to the work carriage is produced by rocking the casing 63, thus to produce the necessary angular motion of the tool, while the extent of this motion, which is determined by the diameter of the tool, is obtained by linear motion of the support 63 axially of the bars 65 and 73 in one or the other direction depending on which side of the desired cam groove the tool is operating upon. The amount of this motion, whether + or − is algebraically added to the feed of the work, that is, the rate of progression of the cutter along the work in the line of the cam path being cut. The angular motion is produced by a second cam disk 90 carried by the ring support 51 and which is rotated as the work piece is rotated. Resting upon its periphery is a follower roll 91 journaled in a slot 92 through an arm 93. The rear end of the arm 93 is fulcrumed at 94 on a bracket 95 fixed to the upper bed 4. The forward end of the arm 93 carries a follower roll 96 upon which rests a follower roll 97 carried by a lever 98. This lever 98 is fulcrumed at 99 on a bracket extension 100 from the tool slide 77. The follower roll 96 is of sufficient width to support the roll 97 for all axial positions of the wheel slide. This arrangement also permits a traverse of the wheel axially of the work, if this is desired, as by turning of the feed screw 80 in one and then in the opposite direction.

The opposite end of the lever 98 is provided with a fulcrum pin 102 provided with rounded ends at 103 (see Figure 4) which are rockably mounted between the forked extremities 104 of an arm 105. The lower end of the arm 105 has secured thereto a block 106 having a pin 107 journaled in an extension 108 of a ring 109 keyed to the rear end of the member 75. As the cam 90 raises the roll 91, the roll 97 is also raised, depressing the opposite end 102 and rocking the member 75, thus to turn the guide bars 65 and 73 about the axis of the member 75, to adjust the guide bars 65 and 73 into an angular position, depending upon the instantaneous slope of the control line, such as the center line of the desired cam groove to the horizontal radius of the cam blank, which is necesary to maintain the point of contact between the cutting tool and the face of the cam groove 28 what it would be with a cutting tool of the predetermined diameter, as, for example, equal to the width of the cam groove. The cam 90 is thus provided with a cam contour correlated to the cam contor of the desired cam groove 28 to provide the desired angular component of motion, while the extent of this motion in this angular path in accordance with the diameter of the cam cutter, is produced by adjusting the lengthwise position of the guide bar 65. Thus as the tool, such as grinding wheel, is reduced in size by wear and truing, this is compensated for by adjustment of the screw 69 by turning the wheel 70.

When it is desired to true the grinding wheel, the inclination of the guide bars 65 and 73 is reduced to zero, that is, so that the depth feed motion transverse to the surface being ground is horizontal, and the grinding wheel is then caused to traverse one or the other of a pair of truing devices, by manipulation of the screw 80. For truing, the screw 3 is preferably set to rough grind position, the drum being locked in position corresponding to that of a cam slop of 90° from the radial, and the truing device being located to barely touch the wheel as withdrawn axially from rough size, and the feed of the wheel against the truing device is accomplished by turning the screw 69 through the knob 70. After truing, the finish grinding may be accomplished by advancing the work bed 4 by turning the screw 3 to finish grind position, allowing the cam 90 to control the angular position of the drum 75 so as to correctly position the wheel relative to the work with the screw 69 adjusted to the proper wheel size as it remained after the truing operation. Such truing devices are shown in Figure 7 at 120 and 121, each of them being mounted on a suitable holder 122 adjustable into and out of truing position. As shown each of these holders is pivoted to a bracket 123, the brackets being fixed to the bed 1 in such position that when the grinding wheel is withdrawn from the work it may be passed across that particular truing device which is placed in angular position to be effective. As shown, for example, the right hand truing device is in truing position, being moved into such position by manipulation of the handle 124 secured to the holder 122, the limiting position being determined by a stop screw 125. When the wheel is in position to grind the right hand face of the cam groove, the right hand truing tool is rendered effective as shown in Figure 7, while when the grinding wheel is moved to operate on the left hand face of the cam groove, the left hand truing device will be made effective in the dotted line position shown in Figure 7, while the right hand truing device will be moved to inoperative position shown in dotted lines in this Figure.

In order to retain the member 75 in truing position, its portion 64 may be formed with a downward extension 130 which may carry a locking pin 131 projectable into a socket 132 in the wheel support 77. This locking pin 131 may be pulled out from the socket 132 when it is desired to operate the machine, and when desired it may be inserted into a fixed socket 133 which hold the member 75 in angular position to lift the cam roller 97 out from engagement with the roller 96, thus to cause the cam 90 to be inoperative. A spring 135 engaging at one end with a manipulating handle 138 projecting downwardly from the member 109 at the other end to a fixed pin 139 normally acts to hold the cam followers in operative relation to the cam 90, and the handle 138 may be manipulated in order to return the member 75 to truing position, or to inoperative angular position, when desired.

It will be noted that whenever the drum portion 75 and its wheel carrier are rocked to compensate for a cutter of less than predetermined diameter, the cutter axis is swung in a path having a large component lying in the direction of feed of the cam blank as it is being turned about its axis by the motor 41. The effect of this is to increase or decrease the rate of relative feed between the cutter and the work, that is, the progress of the cutter along the work, depending upon the direction of this corrective cutter motion. When this direction is opposite to the feed progress direction of the blank, and thus increases the effective feed progress rate, it may be desired to reduce the turning rate of the blank in order that the resultant rate of feed progress may not be excessive. It may also be desirable to progress at a relatively high rate where the changes in direction of the cam groove are small, and to reduce this rate when the cam path becomes more intricate. Means correlated with the angular position of the cam blank may be used, therefore, to control the speed of the motor. Such means, as shown best in Figures 1 and 2, may comprise a third cam ring 150 carried by the cam-carrying ring 51, as shown this ring 150 being positioned between the cam rings 50 and 90. This cam ring 150 has bearing on the edge thereof a spring pressed follower 151 (Figure 2) carried by a fluid control valve 152 interposed in one of the fluid lines 153—preferably the discharge line—of the motor 41. The cam ring 150 is so contoured as to cause the valve 152 to partly close to slow the turning feed motion of the cam blank whenever this may be desired and to allow the motor 41 to operate at a higher speed at other times during the rotation of a cam blank.

Suitable locating pins 155 may be employed to hold the cam rings 50, 90, and 150, the ring 22, the face plate 25, and the cam blank 27 in predetermined angular relation so that the various functions controlled by the cams may be effected in proper angular relation to the cam path cut in the blank.

While this invention has been described with particular reference to the formation of a face cam groove in a cam blank, the invention is also applicable to the cutting of external or internal edge cams, such edge cams being merely portions of cam grooves, the outer or inner walls of which are omitted, and the cutting ordinarily being for the full thickness of the blank instead of only for a part of its thickness as in the case of cutting cam grooves.

The controlling line for the cam contour is spaced therefrom by a distance corresponding to the radius of a rotary cam cutting tool of a standard size which needs no size correction and cuts a correct cam contour with radial displacement only of the blank as the blank revolves. This controlling line may be spaced from the cam wall by a predetermined amount which may, for example, be substantially the radius of a cam follower roll intended to cooperate with the completed cam.

When external or internal cams are being cut, it may sometimes be desired to employ rotary cutting tools or grinding wheels larger than the standard size as hereinbefore specified. When this is done a corrective angular displacement of the tool or wheel axis when operating on cam contours non-perpendicular to a cam radius will be employed, but in the case of larger than standard size cutters, the correction will be in the opposite direction to that required when the cutting tool is of a diameter less than standard diameter, this being necessary in order that the controlled contour may be correct and correspond to the contour made by a cutting tool of the standard radius. Particularly when either the inside or outside edge cams are being ground, traverse of the grinding wheel and work in an axial direction during the cutting operation, as by suitable turning of the screw 80 or otherwise, may be found particularly desirable.

From the foregoing description of an embodiment of this invention, it should be evident to those skilled in the art that various changes and modifications might be made without departing from its spirit or scope.

I claim:

1. A machine of the class described, comprising a work carriage, a work-holding spindle journaled in said carriage, means supporting said carriage for rectilinear motion transverse to the axis of said spindle, a cam carried by said spindle for rotation therewith, a stationary follower for cooperation with said cam to produce rectilinear motion of said carriage corresponding to the contour of said cam, a tool carriage, a grinding wheel carried by said tool carriage for rotation about an axis transverse to the direction of linear motion of said work carriage and movable lengthwise of said axis to present said grinding wheel to and retract it from a cam blank carried by said work spindle, means supporting said grinding wheel on said tool carriage for linear motion transverse to its axis, and means actuable to adjust the angularity of said grinding wheel support into substantially perpendicular relation to the instantaneous slope of the center of width of the desired cam path where said grinding wheel is operating, means for adjusting and holding said grinding wheel with said linear path on said tool carriage parallel to the linear motion of said work spindle, and means for truing said grinding wheel positioned adjacent to its axial path of motion spaced from said blank and while said linear path on said tool carriage is so adjusted and held.

2. A machine of the class described, comprising a bed, a work carriage movable in a linear direction along said bed, a rotary work spindle journaled in said carriage and extending transversely of said direction, means for turning said spindle on its journal axis, means securing a cam blank to said spindle, a tool carriage mounted on said bed for linear motion toward and from said cam blank securing means transverse to said direction, a rotary tool spindle arranged with its axis in the direction of linear motion of said tool carriage, a tool on said tool spindle movable by the linear motion of said tool carriage into and out of cooperative relation to a cam blank secured to said work spindle, means supporting said tool spindle for motion in a linear path of variable angular direction transverse to its axis, means for rotating said tool shaft, a pair of cams carried by said work spindle, means cooperating with one of said cams for moving said work carriage in its linear path to define a desired cam path to be cut in said blank by said tool as said work spindle turns, said other cam being an edge cam, an arm fulcrumed at a fixed point and having a follower riding on said edge cam and provided with a second follower, a lever fulcrumed on said tool slide and having a follower riding on said second follower, said linear path tool spindle supporting means being rockable to change such angular adjustment, connections from said lever effective to rock said angular adjusting supporting means, and means for adjustably positioning said tool spindle in said linear tool spindle path.

3. A machine of the class described, comprising a work carriage, a work-holding spindle journaled in said carriage, means supporting said carriage for rectilinear motion transverse to the axis of said spindle, a cam carried by said spindle for rotation therewith, a stationary follower for cooperation with said cam to produce rectilinear motion of said carriage corresponding to the contour of said cam, a tool carriage, a grinding wheel carried by said tool carriage for rotation about an axis transverse to the direction of linear motion of said work carriage and movable lengthwise of said axis to present said grinding wheel to and retract it from a cam blank carried by said work spindle, means supporting said grinding wheel on said tool carriage for linear motion transverse to its axis, and means actuable to adjust the angularity of said grinding wheel support into substantially perpendicular relation to the instantaneous slope of the center of width of the desired cam path where said grinding wheel is operating, means for adjusting and holding said grinding wheel with said linear path on said tool carriage parallel to the linear motion of said work spindle, means for truing said grinding wheel positioned adjacent to its axial path of motion spaced from said blank and while said linear path on said tool carriage is so adjusted and held, and means for turning said spindle at a rate varying at different angular positions thereof.

PHILIP C. DURLAND.

REFERENCES CITED

The following references are of record in the file of this patent:

UNITED STATES PATENTS

| Number | Name | Date |
|---|---|---|
| 1,228,418 | Eaton | June 5, 1917 |
| 2,060,437 | Harley | Nov. 10, 1936 |
| 2,247,412 | Rybicky | July 1, 1941 |
| 2,415,062 | Green | Jan. 28, 1947 |
| 2,487,201 | Van Buren | Nov. 8, 1949 |

FOREIGN PATENTS

| Number | Country | Date |
|---|---|---|
| 417,612 | Great Britain | Oct. 9, 1934 |
| 643,632 | Germany | Apr. 13, 1937 |